March 1, 1949.   J. W. LATCHUM, JR   2,463,188
METHOD OF PRODUCING LIQUID ANHYDROUS
HYDROGEN CHLORIDE BY DISTILLATION
Filed May 1, 1944
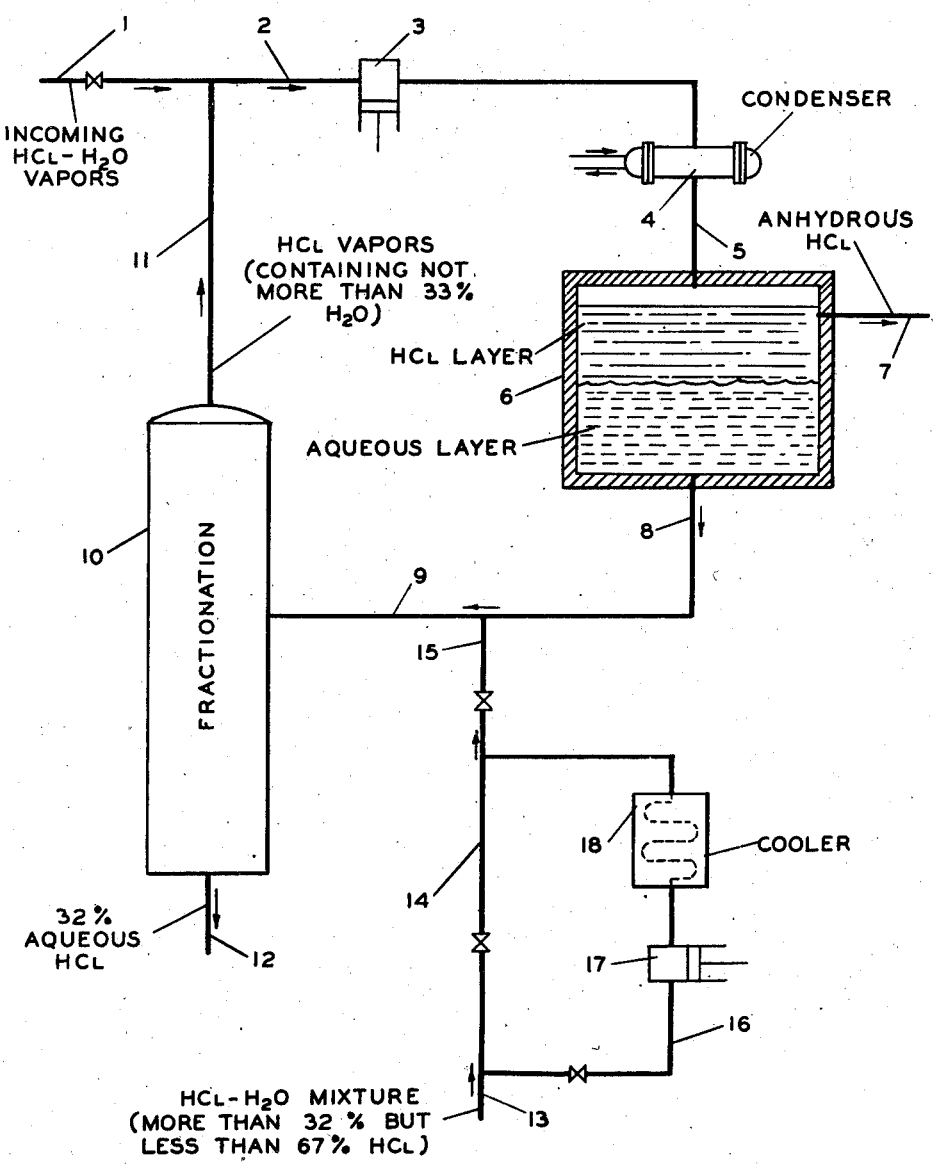
INVENTOR
J. W. LATCHUM, JR.
BY Hudson + Young
ATTORNEYS Patented Mar. 1, 1949

2,463,188

UNITED STATES PATENT OFFICE 2,463,188

METHOD OF PRODUCING LIQUID ANHYDROUS HYDROGEN CHLORIDE BY DISTILLATION

John W. Latchum, Jr., Bartlesville, Okla., assignor to Phillips Petroleum Company, a corporation of Delaware Application May 1, 1944, Serial No. 533,625

3 Claims. (Cl. 202—56)

This invention relates to a process for concentrating hydrogen chloride and more particularly to a process of recovering substantially anhydrous hydrogen chloride, by which I mean hydrogen chloride containing not more than 0.3% of water, from mixtures of hydrogen chloride and water, especially mixtures containing more than 32% hydrogen chloride. The invention is particularly applicable to vaporous mixtures containing at least one-half per cent but not more than 33% by weight of water.

The recovery of anhydrous or even highly concentrated hydrogen chloride is complicated by many factors. Among these are the properties exhibited by hydrogen chloride in the formation of azeotropic mixtures of low hydrogen chloride content and the lack of selective absorption in anhydrous solvents used to extract the hydrogen chloride from solution. Thus, the use of glacial acetic acid (described in the copending application of Hachmuth, Serial No. 434,125, filed April 2, 1942, now Patent 2,355,857, issued August 15, 1944) and of ether (Eng, U. S. 2,282,712) and other solvents to extract anhydrous hydrogen chloride is not entirely satisfactory and is expensive. Likewise in the production of anhydrous hydrogen chloride by means of dehydrating agents such as sulfuric acid, calcium chloride, etc., serious economic problems arise. Additional equipment is required to concentrate for reuse a large volume of diluted dehydrating agent in order to offset the otherwise prohibitive expense incurred by the loss of dehydrating agent and the problem of waste disposal.

The principal object of the present invention is to provide an improved process for the concentration of hydrogen chloride from admixture with water. Another object is to provide a process for the production of substantially anhydrous hydrogen chloride from admixture with water. Another object is to provide a process of the foregoing type which is simple and economical in equipment requirements and in operation. Numerous other objects will hereinafter appear.

The accompanying drawing portrays diagrammatically one arrangement of equipment which may be used in carrying out the present invention.

In accordance with the present invention hydrogen chloride vapor containing less than 33% by weight of water vapor and at least 0.5% of water, and obtained from any suitable source such as a partial dehydration process of the type described below, is subjected to pressure and temperature such as to effect liquefaction thereof. The liquefied mixture is then separated into two liquid phases, namely, a substantially anhydrous hydrogen chloride phase and a heavier water phase which is saturated with hydrogen chloride. These two phases are separately withdrawn. The substantially anhydrous hydrogen chloride phase constitutes the product of the process.

In a more specific aspect of the invention, the water phase is subjected to treatment to drive off hydrogen chloride-water vapors containing not more than 33% by weight of water and these vapors are recycled to the process. This treatment may be fractionation of any suitable type adapted to separate the water phase into a fraction of hydrogen chloride vapors containing not more than 33% by weight of water and a fraction of aqueous hydrogen chloride. This fractionation may be accomplished by flashing, by distillation or by a combination of flashing and distillation. Conveniently, it may be accomplished by flashing to atmospheric pressure followed by distillation at atmospheric pressure to a suitable distilling temperature at which the evolved vapors do not contain more than 33% of water, preferably about 212° F.

The flash vaporization of the hydrogen chloride from the aqueous layer may be accomplished either in a series of flash chambers operating at successively lower pressures or in a single flash chamber in which the desired final pressure is obtained. The nearly anhydrous HCl vapor from the flash chambers is desirably recycled to the incoming HCl-containing vapors. Where these incoming vapors are at an elevated pressure the vapor from the flash chambers should be compressed to the same pressure before being admixed therewith.

The present invention may employ as a starting material a mixture of water and hydrogen chloride containing more than 27% and preferably more than 32%, but less than 67% by weight of hydrogen chloride. Such a mixture may be brought into the liquid state if it is not already liquid and subjected to the treatment described above to separate therefrom hydrogen chloride-water vapors containing not more than 33% of water, these vapors being treated in the manner described above and the aqueous phase obtained being recycled to the treatment step.

The treatment of the aqueous layer or of the incoming water-HCl mixture containing more than 27% and less than 67% of hydrogen chloride, may be effected by passing it through a flash chamber or a series of flash chambers operated at successively lower pressures. The nearly anhydrous vapors from the flash chamber or chambers may be passed to the liquefaction and separation steps. The liquid collecting in the flash chamber or chambers may be progressively heated or fractionated by any suitable means to recover vapors in which the hydrogen chloride content is at least 67% by weight and these vapors passed to the liquefaction and separation steps.

Aqueous solutions containing as little as 26.5% HCl by weight boil at about 212° F. and evolve a vapor containing 69% by weight of HCl. Thus, the present invention is particularly applicable to nearly all plants producing aqueous hydrogen chloride, since with little or no change in processing, a solution stronger than 27% HCl can be recovered from the plants. The vapors evolved from solutions of this composition at atmospheric pressure may be concentrated by the liquefaction and separation steps of this invention and anhydrous hydrogen chloride thereby recovered.

While the system may be applied to water-hydrogen chloride mixtures containing more than 27% of HCl, the preferred feed to the fractionating system contains more than 32% of HCl. However, the system may be operated with mixtures containing somewhat less than 26% HCl provided the recycled aqueous layer is of sufficient strength and in sufficient amount to bring the combined feed to the fractionation system above 27% and preferably above 32% by weight of HCl.

While the invention is most advantageously operated with an initial vapor feed containing 67% or more of hydrogen chloride and a recycle vapor likewise above 67% HCl, the system may be operated less efficiently with either vapor stream substantially less concentrated provided that the combined stream contains 67% or more of HCl.

If desired, the last traces of moisture may be removed from the substantially anhydrous hydrogen chloride product by any suitable means such as treatment with sulfuric acid.

Referring to the drawing, hydrogen chloride-water vapors containing from 0.5 to 33% by weight of water may enter the system via line 1 and pass via line 2 to compressor 3 and condenser 4 which effects liquefaction of the vapors. The resulting liquid passes via line 5 to separation vessel or accumulator 6 wherein phase separation is allowed to take place. Vessel 6 is closed and capable of withstanding the pressure at which the liquid exists. In vessel 6 the condensed liquid separates into an upper substantially anhydrous hydrogen chloride layer which is drawn off continuously via line 7 and a lower aqueous layer saturated with respect to hydrogen chloride, which is drawn off via line 8.

The aqueous layer is passed via lines 8 and 9 to fractionation means 10 which may take the form of a series of flash zones, a single flash zone, a flash zone or zones followed by a fractional distillation step, or any other means adapted to accomplish the desired purpose. Fractionation in unit 10 serves to separate a vaporous fraction of hydrogen chloride containing not more than 33% of water which is recycled via line 11 and a liquid aqueous hydrogen chloride fraction containing at least 27% and preferably at least 32% of hydrogen chloride. The reason for limiting the extent of removal of hydrogen chloride to a figure such as to leave a residue containing HCl in excess of the constant boiling proportion is that as the removal of the excess of hydrogen chloride is more and more complete, the liberated vapors contain more and more water which attains objectionable levels after the concentration of the liquid residue is lowered below 32% and especially below 27%. The stripped aqueous hydrogen chloride leaves via line 12 whence it may pass to suitable concentration equipment or other means for utilizing its HCl content.

Where the available hydrogen chloride-water feed contains less than 67% but more than 27%, and preferably more than 32%, of hydrogen chloride it enters the system via line 13. If it is liquid, it passes via lines 14, 15 and 9 to fractionation unit 10 where hydrogen chloride vapors containing not more than 33% of water are separated therefrom and fed via lines 11 and 2 to the compression and cooling steps as before. If the feed entering via line 13 is in vaporous form, it is preferable to first liquefy it by passing it through line 16, compressor 17 and cooler 18 before it is passed to fractionation unit 10.

Following are non-limiting specific examples illustrating the practice of the present invention:

*Example I*

A stream of vapors composed of 70% HCl and 30% water at 100° F. and 200 p. s. i. pressure was compressed to 1200 p. s. i., cooled to 100° F. and passed into an accumulator. The liquid separated into two layers, the lighter of which analyzed 99.7% HCl. The heavier aqueous layer, analyzing 62.8% HCl and 37.2% H$_2$O, was flashed to atmospheric pressure at 100° F., and the vapors of HCl were compressed and returned to the initial stream. The liquid which collected in the bottom of the flash chamber analyzed 39.5% HCl, and was slowly heated to a temperature of 213° F. The vapors evolved were added to the recycle stream. The kettle liquid from this distillation which analyzed 32% HCl represented 400 parts per 1000 by weight of initial feed and corresponded to an 81.7% recovery of HCl.

*Example II*

A stream of vapors composed of 80% HCl and 20% water was condensed and cooled, the condensate separating into two layers. The lighter layer of 99.6% HCl was removed and the lower aqueous layer was distilled to a temperature of 212° F. The vapors evolved were added to the recycle stream. The kettle liquid of this distillation tested 33% HCl and represented 275 parts per 1000 by weight of the initial feed, corresponding to an 88.7% recovery of HCl.

I claim:

1. The process of recovering anhydrous hydrogen chloride from a gaseous water-hydrogen chloride mixture composed of 70 per cent hydrogen chloride and 30 per cent water, which comprises subjecting such mixture to a pressure of 1200 pounds per square inch at 100° F. so as to liquefy said mixture; introducing said mixture into an accumulator so as to allow said mixture to separate into two layers; withdrawing a lighter portion; flashing a heavier portion to atmospheric pressure; withdrawing flashed vapors and recycling said vapors to said gaseous water-hydrogen chloride mixture; withdrawing residue liquid from said flashing containing 32 per cent hydrogen chloride by weight.

2. The process of recovering anhydrous hydrogen chloride from a gaseous water-hydrogen chloride mixture containing 0.5 to 33 per cent by weight water, which comprises subjecting said mixture to pressure and temperature such as to effect liquefaction thereof, thereby forming a liquid anhydrous hydrogen chloride phase and a liquid aqueous phase containing dissolved hydrogen chloride, withdrawing said liquid anhydrous hydrogen chloride phase as a product of the process, vaporizing a portion of said liquid aqueous phase to produce a vapor fraction containing not more than 33 per cent water and a liquid aqueous residue containing at least 27 per cent hydrogen chloride, withdrawing said aqueous residue, and admixing said vapor fraction with the first said gaseous water-hydrogen chloride mixture.

3. An improved process of recovering anhydrous hydrogen chloride from a mixture of hydrogen chloride and water containing at least 0.5 per cent and not more than 33 per cent by weight of water, which comprises subjecting said mixture to a temperature and pressure such that a liquid anhydrous hydrogen chloride phase and a separate liquid water phase are formed, recovering said liquid anhydrous hydrogen chloride phase as a product of the process, separating by distillation said liquid water phase into a vaporous hydrogen chloride fraction containing not more than 33 per cent by weight water and a liquid aqueous fraction containing at least 27 per cent by weight of hydrogen chloride, and subjecting said vaporous hydrogen chloride fraction to a temperature and pressure such as to liquefy same as at least a part of the first said mixture of hydrogen chloride and water.

JOHN W. LATCHUM, Jr.

REFERENCES CITED

The following references are of record in the file of this patent:

UNITED STATES PATENTS

| Number | Name | Date |
|---|---|---|
| 1,489,009 | Rohmer | Apr. 1, 1924 |
| 1,897,996 | Barstow | Feb. 21, 1933 |
| 1,906,467 | Heath | May 2, 1933 |

OTHER REFERENCES

Rupert: "A Study of the System Hydrogen Chloride-Water," J. Am. Chem. Soc. 31, 1909, pages 851–866.

Lowry: Inorganic Chemistry, Macmillan, 1931, pages 324, 325.

"Comprehensive Treatise on Organic and Theoretical Chemistry," by Mellor. Page 183 of volume 2 relied on. Oct. 10, 1933.